Feb. 21, 1956  A. A. ZOGG ET AL  2,735,198
TRACTOR ACTUATED GRUBBING IMPLEMENT FOR SMALL TREES AND THE LIKE
Filed March 12, 1951
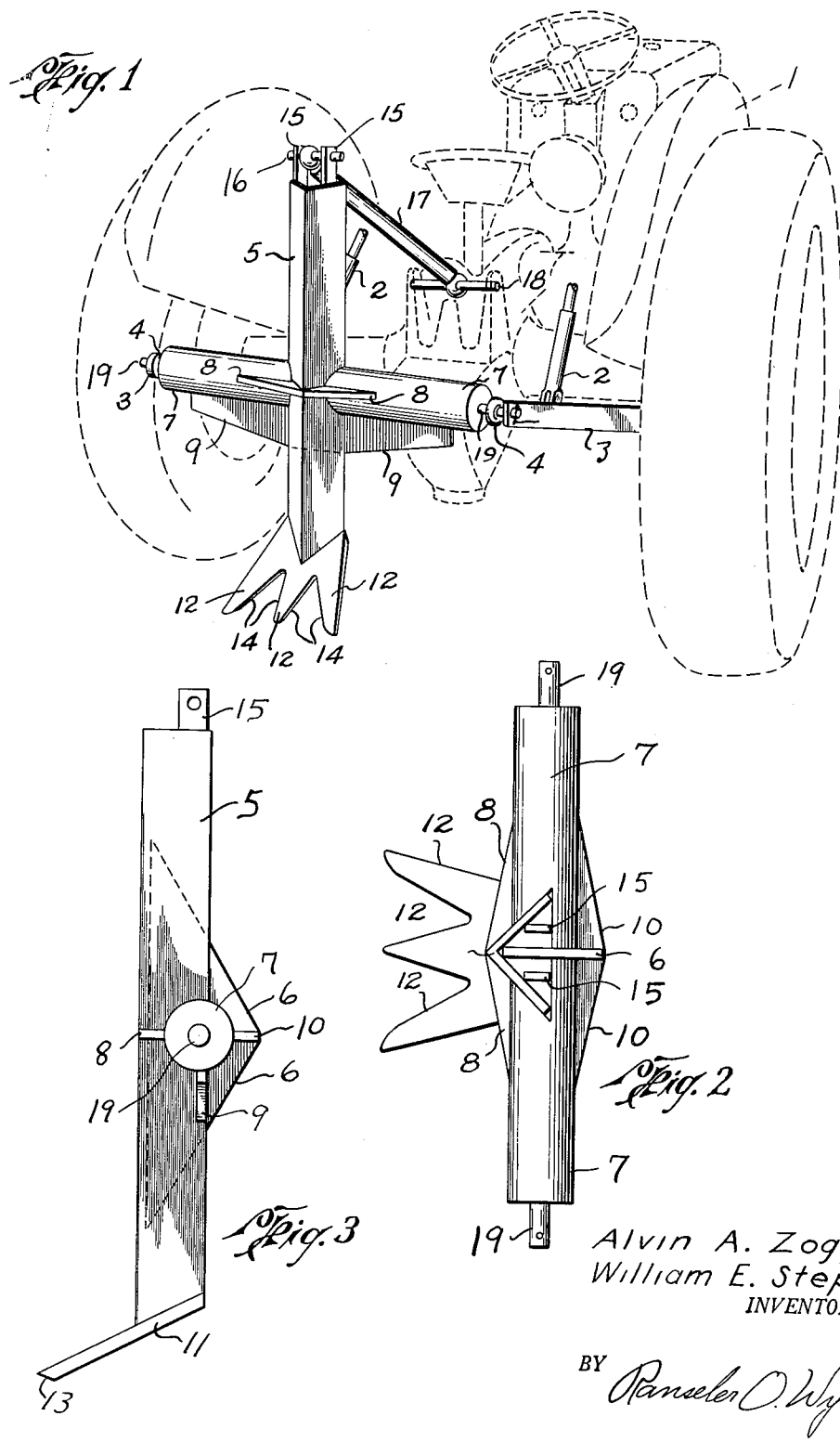
Alvin A. Zogg
William E. Stephens
INVENTORS
BY Ranseler O. Wyatt
ATTORNEY

United States Patent Office 2,735,198
Patented Feb. 21, 1956

2,735,198

TRACTOR ACTUATED GRUBBING IMPLEMENT FOR SMALL TREES AND THE LIKE

Alvin A. Zogg and William E. Stephens, Houston, Tex.

Application March 12, 1951, Serial No. 215,068

3 Claims. (Cl. 37—2)

This invention relates to new and useful improvements in a grubbing implement for use on tractors, particularly on tractors having lifting facilities, and the method of grubbing brush.

It is an object of this invention to provide an implement of the character described that may be readily attached to the ordinary farm tractor having lifting equipment and applied to uproot small trees and the like.

It is another object of this invention to teach a method of grubbing small trees and the like whereby the pushing force of the tractor as well as the lifting power of the lifting mechanism are simultaneously applied to uproot the vegetation.

With the above and other objects in view, the invention has relation to certain novel features of construction and operation more particularly described in the following specifications and illustrated in the accompanying drawings, wherein:

Figure 1 is a perspective elevational view of the device as attached to a tractor.

Figure 2 is a top plan view of the implement, and

Figure 3 is a side elevational view.

Referring now more particularly to the drawings, the numeral 1 designates a tractor of any desired make having a lifting mechanism, as the hydraulic lifting means 2, 2. A pair of stabilizing bars, as 3, parallel the lifting bars 4, 4, which are in pivotal connection with the hydraulic lifting means 2, 2 and both the stabilizing bars 3 and the lifting bars 4 are pivotally anchored to the tractor in the usual manner (not shown).

The grubbing implement consists of an upright rigid shaft 5 composed of suitable material such as angle iron, sufficiently reinforced as by the plates, or gussets, 6, 6, and having the cross bars 7, 7 which are reinforced by plates, or gussets, 8, 10.

A foot, or shoe, 11 is mounted on the lower end of the shaft 5 at an angle to facilitate digging into the earth during grubbing operation. This foot may be of any desired shape, but is preferably formed of three prongs 12, each of said prongs being upwardly beveled at the outer ends thereof, as at 13, and having inwardly beveled cutting edges 14.

On the upper end of the shaft are the upwardly extended connecting arms 15, 15 having suitable ports therethrough adapted to receive a pin as 16 to pivotally secure same to the connecting bar 17 which is pivotally anchored to the tractor by the pin 18.

Extending axially from the outer ends of the cross bars 7, 7 are the bearings 19, 19 having ports extending transversely therethrough to receive suitable locking pins 20, 20. The bearings 19, 19 extend through suitable ports in the outer ends of the lifting bars 4, 4 and through suitable ports in the outer ends of the stabilizing bars 3, 3.

The implement is connected to the lifting means of a tractor as shown and the lifting means lowered until the shoe 11 is at the ground surface immediately adjacent the trunk of the brush to be uprooted. The tractor is then placed in reverse and as it moves backwardly the shoe 11 will dig into the earth, passing beneath the trunk of the brush, or the like, and the sharp edges 14 of the prongs 12 cutting into the root system and securing a firm grip therein. The prongs 12 are outwardly tapered, their free ends coming to a point, and the outside prongs are widespread at their outer ends, permitting a fork-like grip in the root system. When the shoe is securely embedded in the root system, the lifting means is utilized to apply a lifting pressure to the shoe in cooperation with the pushing pressure of the tractor, and the vegetation is uprooted.

The fork-like formation of the shoe prongs and the combination of lift and push, permits uprooting of small trees and the like with a minimum damage to the roots and with very little disturbance of the soil.

While the foregoing is considered a preferred form of the invention, it is by way of illustration only, the broad principle of the invention being defined by the appended claims.

What we claim is:

1. In a grubbing implement, an upright shaft, supporting aligned cross bars extending transversely in opposite directions from said shaft, means at the free ends of said cross bars pivotally connected to the lifting bars of a tractor, a shoe on one end of said shaft having rearwardly and downwardly extending tapered prongs, and a connecting bar on the other end of said shaft maintaining said shoe in grubbing position, said connecting bar being downwardly extended and pivotally mounted on the tractor and being shorter than said lifting bars.

2. In a grubbing implement, an upright member having a downwardly and rearwardly extended pronged digging means at one end and a pivotally mounted connecting bar at the other end, said bar being downwardly extended and pivotally anchored to a tractor, and arms extending laterally from said upright member having means at the free ends thereof pivotally connected with the lifting bars of a tractor to selectively move said digging means into grubbing position and to elevate said digging means to complete the grubbing operation, the connecting bar being shorter than the lifting bars, to impart a rearward thrust.

3. In a grubbing implement for use on tractors, a rigid upright member having a pivotally mounted downwardly extended guide rod at one end and a downwardly and rearwardly extending shoe at its other end, said shoe having outwardly spread tapered prongs said prongs having cutting edges, and a transverse cross arm intermediate said upright member pivotally mounted at each free end on the lifting bars of a tractor, the guide rod being shorter than the lifting bars, so as to selectively impart a lifting movement to said shoe.

References Cited in the file of this patent

UNITED STATES PATENTS

| 145,737 | Jones | Dec. 23, 1873 |
| 905,399 | Zimmerman | Dec. 1, 1908 |
| 1,346,261 | Schmutte | July 13, 1920 |
| 1,624,610 | Matson | Apr. 12, 1927 |
| 2,302,801 | Powelson | Nov. 24, 1942 |
| 2,303,415 | Williams | Dec. 1, 1942 |
| 2,482,950 | Toftey | Sept. 27, 1949 |
| 2,528,170 | Peacock | Oct. 31, 1950 |
| 2,618,871 | Craver | Nov. 25, 1952 |
| 2,626,468 | Dobrinich | Jan. 27, 1953 |

OTHER REFERENCES

Farm Implement and Machinery Review; vol. 74, No. 885; January 1, 1949; page 940. (Copy in Library and in Division 1.) (97–FERG.)